US011170671B1

(12) United States Patent
Han et al.

(10) Patent No.: US 11,170,671 B1
(45) Date of Patent: Nov. 9, 2021

(54) FLEXIBLE DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Wen Han, Hubei (CN); Zhuo Zhang, Hubei (CN); Fang Wang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 188 days.

(21) Appl. No.: 16/621,380

(22) PCT Filed: Oct. 21, 2019

(86) PCT No.: PCT/CN2019/112274
§ 371 (c)(1),
(2) Date: Dec. 11, 2019

(87) PCT Pub. No.: WO2020/220601
PCT Pub. Date: Nov. 5, 2020

(30) Foreign Application Priority Data

Apr. 29, 2019 (CN) .......................... 201910356566.0

(51) Int. Cl.
G09F 9/30 (2006.01)
G06F 1/16 (2006.01)

(52) U.S. Cl.
CPC ............ *G09F 9/301* (2013.01); *G06F 1/1652* (2013.01); *G06F 2200/1634* (2013.01)

(58) Field of Classification Search
CPC combination set(s) only.
See application file for complete search history.

(56) References Cited

U.S. PATENT DOCUMENTS

| 8,376,581 | B2 * | 2/2013 | Auld | G09F 9/301 |
| | | | | 362/249.02 |
| 10,671,124 | B2 * | 6/2020 | Kim | G06F 1/1643 |
| 10,783,809 | B2 * | 9/2020 | Kim | G09F 9/301 |
| 2012/0002357 | A1 * | 1/2012 | Auld | G09F 21/04 |
| | | | | 361/679.01 |
| 2016/0155965 | A1 * | 6/2016 | Ura | H01L 51/0024 |
| | | | | 361/749 |
| 2019/0204874 | A1 * | 7/2019 | Kim | G06F 1/1643 |
| 2020/0043386 | A1 * | 2/2020 | Kim | G09F 9/301 |
| 2020/0058272 | A1 * | 2/2020 | Oh | G09G 5/006 |
| 2020/0394942 | A1 * | 12/2020 | Kim | G09F 9/301 |
| 2021/0056872 | A1 * | 2/2021 | Kwon | G09F 9/301 |

* cited by examiner

Primary Examiner — Lisa Lea-Edmonds

(57) ABSTRACT

The present invention provides a flexible display device including: a display module; an accommodating casing defined with a hollow cavity, an open channel defined in the accommodating casing, a chain lock disposed in the open channel, a resilient member, a first roller, and a second roller disposed in the hollow cavity, the resilient member forming a pre-pulling on the display module; the chain lock disassembling the display module into a first assembly and a second assembly to be rolled up on the first roller and the second roller respectively, and configured to combine the first assembly and the second assembly into the display module.

20 Claims, 4 Drawing Sheets

FLEXIBLE DISPLAY DEVICE

FIELD OF INVENTION

The present invention relates to a field of display technologies, especially a flexible display device.

BACKGROUND OF INVENTION

Because a flexible display panel can be manufactured into various forms, it is favored by the application market. At the same time, as people's demands for visual enjoyment increase, larger display screens have become the development trend of the future market. However, the oversized display panel disadvantages carrying and storing. At present, the flexible display is converted between large and small screens by adopting an outward or inward folding form or a rolling form. However, if a curling radius is smaller or a diameter of a roller is smaller, failure such as separation of films and cracks will occur on the display panel due to excessive stress on a portion thereof. Therefore, employing bending resistance capability of the flexible display panel to reduce the stress on the folded/rolled up flexible display for storage in a smaller space has become an issue to be solved.

Therefore, the prior art has defects and needs to be improved urgently.

SUMMARY OF INVENTION

The present invention provides a flexible display device that is able to solve the technical issue of the conventional flexible display device that bending stress on the rolled up/folded flexible display panel is excessive and causes risks of separation of films and cracks, and an occupied space is large.

To solve the above issue, technical solutions provided by the present invention are as follows.

The present invention provides a flexible display device, comprising:

a display module, the display module comprising a display panel, and a protective lid and a metal supporting layer located on two sides of the display panel respectively;

an accommodating casing, a hollow cavity defined in the accommodating casing, an open channel defined in a side of the accommodating casing, a chain lock disposed in the open channel, the chain lock configured to disassemble the display module into a first assembly and a second assembly and configured to combine the first assembly and the second assembly into the display module; and a resilient member, a first roller, and a second roller disposed in the hollow cavity, the resilient member fixed in the hollow cavity, the first assembly connected to an end of the resilient member through the first roller, and the first roller configured to roll up or unroll the first assembly, the second assembly connected to the second roller, and the second roller configured to roll up or unroll the second assembly;

wherein the display module is rolled up or unrolled by locking or unlocking the chain lock, and a radius of a cross section of the first roller is less than or equal to a radius of a cross section of the second roller.

In the flexible display device of the present invention, the flexible display device comprises at least two first rollers, and the at least two first rollers are disposed parallelly and are staggered.

In the flexible display device of the present invention, the radius of the first roller is less than or equal to 1 mm.

In the flexible display device of the present invention, contact surfaces of the display panel and the metal supporting layer are disposed with protrusions and indentations respectively, and the protrusions match the indentations.

In the flexible display device of the present invention, the chain lock is connected to an edge portion of the display module, when the chain lock combines the first assembly and the second assembly into the display module, the protrusions and the indentations of the contact surfaces of the display panel and the metal supporting layer are engaged with one another, when the chain lock disassembles the display module into the first assembly and the second assembly, the protrusions and the indentations of the contact surfaces of the display panel and the metal supporting layer are disengaged from one another.

In the flexible display device of the present invention, the first assembly comprises the protective lid, the second assembly comprises the display panel and the metal supporting layer; or, the first assembly comprises the protective lid and the display panel, and the second assembly comprises the metal supporting layer.

In the flexible display device of the present invention, the flexible display device further comprises a handgrip, the handgrip is disposed outside the hollow cavity and is arranged corresponding to the open channel, and the handgrip is connected to an end of the display module, a length/width of the handgrip is large than a length/width of the open channel, and the handgrip is configured to hold the end of the display module outside the hollow cavity when the display module is rolled up and received in the accommodating casing.

In the flexible display device of the present invention, the resilient member comprises a spiral spring, and an end of the spiral spring is connected to a first extension portion of the protective lid.

In the flexible display device of the present invention, a second extension portion of the metal supporting layer is connected to the second roller.

In the flexible display device of the present invention, a lock is disposed in the open channel, the lock is locked when the display panel is pulled out from the accommodating casing for a determined length, and the lock is unlocked when the display module is rolled up.

To solve the above issue, the present invention also provides a flexible display device, comprising:

a display module, the display module comprising a display panel, and a protective lid and a metal supporting layer located on two sides of the display panel respectively;

an accommodating casing, a hollow cavity defined in the accommodating casing, an open channel defined in a side of the accommodating casing, a chain lock disposed in the open channel, the chain lock configured to disassemble the display module into a first assembly and a second assembly and configured to combine the first assembly and the second assembly into the display module; and a resilient member, a first roller, and a second roller disposed in the hollow cavity, the resilient member fixed in the hollow cavity, the first assembly connected to an end of the resilient member through the first roller, and the first roller configured to roll up or unroll the first assembly, the second assembly connected to the second roller, and the second roller configured to roll up or unroll the second assembly;

wherein the display module is rolled up or unrolled by locking or unlocking the chain lock.

In the flexible display device of the present invention, the flexible display device comprises at least two first rollers, and the at least two first rollers are disposed parallelly and are staggered.

In the flexible display device of the present invention, a radius of the first roller is less than or equal to 1 mm.

In the flexible display device of the present invention, contact surfaces of the display panel and the metal supporting layer are disposed with protrusions and indentations respectively, and the protrusions match the indentations.

In the flexible display device of the present invention, the chain lock is connected to an edge portion of the display module, when the chain lock combines the first assembly and the second assembly into the display module, the protrusions and the indentations of the contact surfaces of the display panel and the metal supporting layer are engaged with one another, when the chain lock disassembles the display module into the first assembly and the second assembly, the protrusions and the indentations of the contact surfaces of the display panel and the metal supporting layer are disengaged from one another.

In the flexible display device of the present invention, the first assembly comprises the protective lid, the second assembly comprises the display panel and the metal supporting layer; or, the first assembly comprises the protective lid and the display panel, and the second assembly comprises the metal supporting layer.

In the flexible display device of the present invention, the flexible display device further comprises a handgrip, the handgrip is disposed outside the hollow cavity and is arranged corresponding to the open channel, and the handgrip is connected to an end of the display module, a length/width of the handgrip is large than a length/width of the open channel, and the handgrip is configured to hold the end of the display module outside the hollow cavity when the display module is rolled up and received in the accommodating casing.

In the flexible display device of the present invention, the resilient member comprises a spiral spring, and an end of the spiral spring is connected to a first extension portion of the protective lid.

In the flexible display device of the present invention, a second extension portion of the metal supporting layer is connected to the second roller.

In the flexible display device of the present invention, the lock is disposed in the open channel, the lock is locked when the display panel is pulled out from the accommodating casing for a determined length, and the lock is unlocked when the display module is rolled up.

Advantages of the present invention are as follows. Compared to the conventional flexible display device, the flexible display device provided by the present invention, by changing a rolling way of a single roller, divides the display module into different assemblies to be rolled up respectively. A plurality of rollers staggered left and right are disposed in the accommodating casing such that a display panel with a greater area is rolled up in the accommodating casing. A number of the rollers is an even number such that the display panel is disposed in the accommodating casing in a S-shape rolling way to form a multi-layer hybrid rolling mode. Such design drastically offsets pulling stress and compressive stress on the assembly, reduces failure such as separation of films, cracks, and bright lines and dark lines due to excessive stress on a portion of the assembly, and therefore achieve a smaller rolling radius. Furthermore, a length of the protective lid is far greater than a length of the display panel, During pulling, the display panel is not forced, and actually the protective lid is dragged by the spiral spring. Moreover, a pre-tension force always exists on the protective lid such that a non-flatness issue of the curled display panel is prevented and surface flatness and hardness are enhanced.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
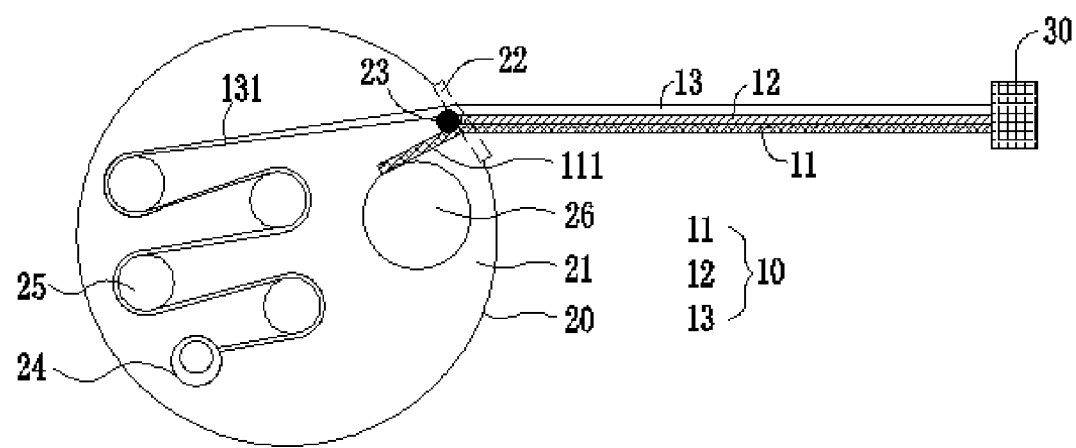
FIG. 1 is a schematic view of a flexible display device provided by an embodiment of the present invention in an expanding condition.

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention. In the figures, units with similar structures are marked with the same reference characters.

The present invention aims at the technical issue of the conventional flexible display device that bending stress on the rolled up/folded flexible display panel is excessive and causes risks of separation of films and cracks, and an occupied space is large. The present embodiment can solve the defects.

With reference to FIG. 1, FIG. 1 is a schematic view of a flexible display device provided by an embodiment of the present invention in an expanding condition. The flexible display device comprises a display module 10. The display module 10 comprises a display panel 12, and a protective lid 13 and a metal supporting layer 11 located on two sides of the display panel 12 respectively. The metal supporting layer 11 has a determined hardness and can perform a function of supporting the display panel 12 when the display module 10 is expanded. When the display module 10 is in an expanded status, the display module 10 is a stacked structure including the metal supporting layer 11, the display panel 12, and the protective lid 13 that are stacked sequentially on one another.

The display panel 12 includes a flexible organic light emitting diode (OLED) display panel, a white OLED (WOLED) display panel, a liquid crystal display (LCD)

display panel, and a micro-LED display panel. The protective lid 13 is a common encapsulating lid and is not limited.

The flexible display device comprises an accommodating casing 20. A hollow cavity 21 is defined in the accommodating casing 20, and is configured to receive the display module 10 when the display module 10 is rolled up. An open channel 22 is defined in a side of the accommodating casing 20, and a sectional area of the open channel 22 is large than a sectional area of the display module 10. The display module 10 can be pulled out from the accommodating casing 20 through the open channel 22, and can be rolled up back into the accommodating casing 20 through the open channel 22.

A periphery of the open channel 22 has a rounded design or other design for improving smoothness to ensure that a surface of the display module 10 is prevented from scratches.

A chain lock 23 is disposed in the open channel 22 of the accommodating casing 20. The chain lock 23 is configured to disassemble the display module 10 into a first assembly and a second assembly, and is configured to combines the first assembly and the second assembly into the display module 10.

The first assembly comprises the display panel 12 and the protective lid 13, and the second assembly comprises the metal supporting layer 11. Alternatively, the first assembly comprises the protective lid 13, and the second assembly comprises the display panel 12 and the metal supporting layer 11.

A resilient member 24, a first roller 25, and a second roller 26 are disposed in the hollow cavity 21 of the accommodating casing 20. The resilient member 24 is fixed in the hollow cavity 21, and an end of the resilient member 24 is connected to a first extension portion 131 of the protective lid 13. A second extension portion 111 of the metal supporting layer 11 is connected to the second roller 26. The first roller 25 is configured to roll up or expand the first assembly, the second roller 26 is configured to roll up or expand the second assembly.

A radius of a cross section of the first roller 25 is less or equal to a radius of a cross section of the second roller 26. Because of consideration of a space ratio and difference of bending capabilities of the first assembly and the second assembly, the radius of the cross section of the first roller 25 provided by the present embodiment is less than the radius of the cross section of the second roller 26 while a volume of the accommodating casing 20 is made as smaller as possible.

In the present embodiment, at least two first roller 25 arranged parallelly and staggered. The figure only illustrates four first rollers 25 and one the second roller 26, but is not limited thereto. Both the first roller 25 and the second roller 26 can plural. As shown in the figures, an axial direction of the first roller 25 is perpendicular to a moving direction of the display module 10, a length of the first roller 25 along an axial direction is greater than or equal to a width of the display module 10. Designs of the second roller 26 and the first roller 25 are similar except that似, cross-sectional radiuses are different. The cross-sectional radiuses of the first rollers 25 are equal.

Furthermore, the first roller 25 and the second roller 26 are located on two sides of the hollow cavity 21 respectively, and a predetermined distance is disposed therebetween to prevent interference or friction scratch on the first assembly and the second assembly when they are rolled up or expand.

In an embodiment, the cross-sectional radius of the first roller 25 is less than or equal to 1 mm such that the space of the accommodating casing 20 is further reduced in a range of bending stress of the first assembly.

As shown in the figures, the first rollers 25 are designed in left-right staggered arrangement. After the display module 10 expands, the first extension portion 131 of the protective lid 13 is rolled up on adjacent two of the first rollers 25 in a S-shaped curling way, and is connected to the resilient member 24. the resilient member 24 comprises but is not limited to a spiral spring. An end of the spiral spring is connected to the first extension portion 131 of the protective lid 13. Because the spiral spring actually drags the protective lid 13, in other words, during the pull and expansion of the display panel 12, it suffers no dragging force by the spiral spring such that the display panel 12 is prevented from damage. Furthermore, because the spiral spring provides the protective lid 13 with a pre-pulling force, such that the non-flatness issue of the expanding or rolled display panel 12 is prevented and surface flatness and hardness are improved.

Similarly, the second roller 26 can also provide the metal supporting layer 11 with a pre-pulling force such that the display module 10 maintains the flatness thereof when expanding.

Figure 2:
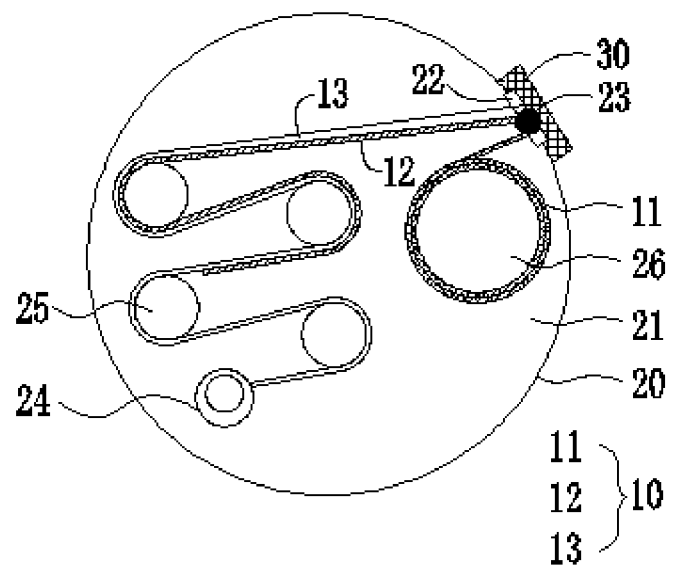
FIG. 2 is a schematic view of the flexible display device provided by an embodiment of the present invention in a rolled up condition.

With reference to FIG. 2, FIG. 2 is a schematic view of the flexible display device provided by an embodiment of the present invention in a rolled-up condition. The display module 10 can be rolled up into the accommodating casing 20 by the pre-pulling force of the spiral spring, or can rolled up by other external force, and it is not limited herein. When the display module 10 is rolled up, the chain lock 23 disassembles the display module 10 into the first assembly and the second assembly, when at least one portion of the first assembly combining the protective lid 13 the display panel 12 is received in the accommodating casing 20, portions of the protective lid 13 and the display panel 12 receiving in the accommodating casing 20 are S-shaped and rolled up on adjacent two of the first rollers 25. In other words, the display panel 12 laminated on the protective lid 13 is rolled up when the protective lid 13 is rolled up. At the meantime, the second assembly formed on the metal supporting layer 11 is also rolled up on the second roller 26. Actions of rolling/expanding of the first assembly and the second assembly are implemented simultaneously.

Because the spiral spring has the pre-pulling force on the protective lid 13, when the first assembly is rolled up in the accommodating casing 20, the surface flatness thereof can also be ensured, so does the second assembly, and the description thereof is not repeated herein.

In the present embodiment, the second roller 26 with the greater cross-sectional radius is mainly configured to roll up the metal supporting layer 11, and the first roller 25 with the less cross-sectional radius is mainly configured to roll up the protective lid 13 and the display panel 12. Because the metal supporting layer 11 is mostly made of metallic material (stainless steel or amorphous material), it has high modulus and is not ductile material. Under a same bending radius, a deformation amount of the metal supporting layer 11 is less than that of the first assembly, and affects the flatness thereof more after expansion when compared to a small radius of a roller. Therefore, for a rolling design, the present embodiment employs such a mode of individually rolling the display panel 12 and the metal supporting layer 11 to roll up the metal supporting layer 11 on the individual second roller 26 with the greater cross-sectional radius. Such design on one hand reduces stress increase of the display panel 12 due to different deformation rates, and on the other hand makes the softer display panel 12 be able to be rolled up on the first roller 25 with a smaller cross-sectional radius, which extremely save the rolling space.

In the present embodiment, a number of the first rollers 25 is an even number, and the first roller 25 is a roller with a cross-sectional radius not greater than 1 mm. Therefore, the display panel 12 rolled up in the accommodating casing 20 exists in the S-shape to form a multi-layer hybrid rolling mode. Because inward rolling and outward rolling portions of the display panel 12 are rolled up on the first rollers 25 with the same diameter and are therefore suffer similar or identical pulling and compressive stress, the stress on the films is released such that more dispersed and smaller stress are on the first assembly to make the display panel 12 be able to be rolled up around a finer roller without separation of films, cracks, and bright lines/dark lines due to increased stress.

With reference to FIGS. 1 and 2, because the chain lock 23 is disposed in the open channel 22, when the display module 10 is rolled up inward, disassembling of the display module 10 is achieved by the chain lock 23. When the display module 10 is pulled out, assembling of the display module 10 is achieved through the chain lock 23. Furthermore, a handgrip 30 is disposed on an end of the display module 10. The handgrip 30 corresponds to the open channel 22 and is disposed outside the hollow cavity 21, and the handgrip 30 is connected to an end of the display module 10. A length/width of the handgrip 30 is greater than a length/width of the open channel 22, the handgrip 30 is configured to pull out the display panel 12 rolled up in the accommodating casing 20, and is configured to hold the end of the display module 10 outside the hollow cavity 21 to complete the rolling when the display module 10 is rolled up in the accommodating casing 20.

In an embodiment, a lock (not shown) is disposed in the open channel 22. When the display panel 12 is pulled out from the accommodating casing 20 for a predetermined length (or pulled out completely), the lock is in a locked status to prevent the first extension portion 131 and the second extension portion 111 from further being pulled out of the accommodating casing 20. When the display module 10 is rolled up, the lock is in an unlocked status to make the display module 10 be rolled up in the accommodating casing 20 by the spiral spring.

Figure 3:
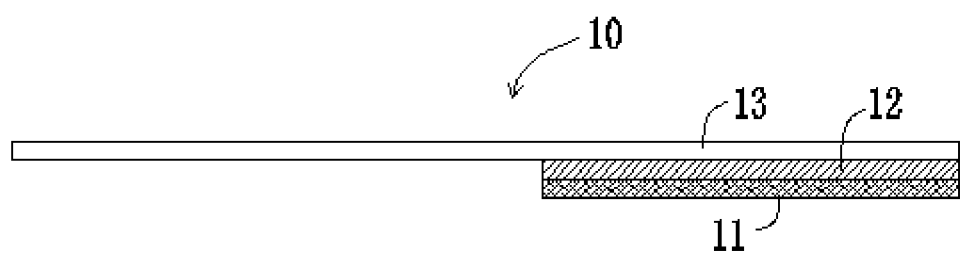
FIG. 3 is a schematic view of films of the flexible display device provided by an embodiment of the present invention.

With reference to FIG. 3, FIG. 3 is a schematic view of films of the flexible display device provided by an embodiment of the present invention. The display panel 12 is sandwiched between the protective lid 13 and the metal supporting layer 11. A length of the protective lid 13 is greater than a length of the display panel 12 and a length of the metal supporting layer 11. The length of the metal supporting layer 11 is equal to the length of the display panel 12. Alternatively, the length of the metal supporting layer 11 is between the lengths of the protective lid 13 and the display panel 12.

Figure 4:
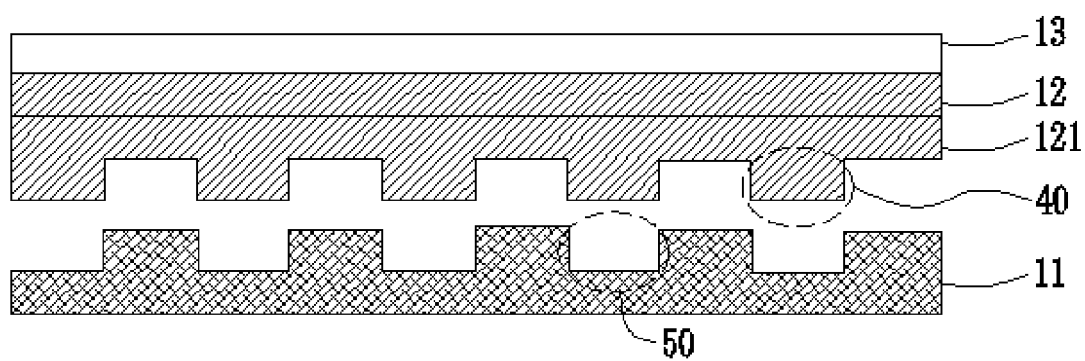
FIG. 4 is a schematic cross-sectional view of contact surfaces of a first assembly and a second assembly provided by an embodiment of the present invention.

With reference to FIG. 4, FIG. 4 is a schematic cross-sectional view of contact surfaces of a first assembly and a second assembly provided by an embodiment of the present invention. The display panel 12 is laminated on the protective lid 13 and forms the first assembly. The metal supporting layer 11 forms the second assembly. protrusions 40 and indentations 50 are disposed on contact surfaces of the display panel 12 and the metal supporting layer 11 respectively, and the protrusions 40 match the indentations 50.

The protrusions 40 and the indentations 50 can be distributed on the entire contact surfaces, and can also partially distributed on portions of the contact surfaces. The present embodiment has no limitations to numbers, positions, shapes and dimensions of the protrusions 40 and the indentations 50 as long as it is guaranteed that the first assembly can be engaged with the second assembly through the protrusions 40 and the indentations 50.

In an embodiment, the chain lock 23 is connected to an edge portion of the display module 10, and the protrusions 40 and the indentations 50 are disposed to be correspond to a position of the chain lock 23. When the chain lock 23 combines the first assembly and the second assembly into the display module 10 (i.e., the display module is pulled out), the protrusions 40 and the indentations 50 on the contact surfaces between, the display panel 12 and the metal supporting layer 11 are engaged with one another such that no gaps/bubbles are between the display panel 12 and the metal supporting layer 11. When the chain lock 23 disassembles the display module 10 into the first assembly and the second assembly (i.e., the display module is rolled up), the protrusions 40 and the indentations 50 of the contact surfaces between the display panel 12 and the metal supporting layer 11 are disengaged from one another.

The display panel 12 comprises a backplate 121 located near a side of the metal supporting layer 11. The protrusions 40 and the indentations 50 are formed on contact surfaces of the backplate 121 and the metal supporting layer 11.

In the present embodiment, the accommodating casing 20 employs a circular design, but is not limited thereto, and can be other design.

As described above, the flexible display device provided by the present invention, by changing a rolling way of a single roller, divides the display module into different assemblies to be rolled up respectively. A plurality of rollers staggered left and right are disposed in the accommodating casing such that a display panel with a greater area is rolled up in the accommodating casing. A number of the rollers is an even number such that the display panel is disposed in the accommodating casing in a S-shape rolling way to form a multi-layer hybrid rolling mode. Such design drastically offsets pulling stress and compressive stress on the assembly, reduces failure such as separation of films, cracks, and bright lines and dark lines due to excessive stress on a portion of the assembly, and therefore achieve a smaller rolling radius. Furthermore, a length of the protective lid is far greater than a length of the display panel, During pulling, the display panel is not forced, and actually the protective lid is dragged by the spiral spring. Moreover, a pre-tension force always exists on the protective lid such that a non-flatness issue of the curled display panel is prevented and surface flatness and hardness are enhanced.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A flexible display device, comprising:
a display module, the display module comprising a display panel, and a protective lid and a metal supporting layer located on two sides of the display panel respectively;
an accommodating casing, a hollow cavity defined in the accommodating casing, an open channel defined in a side of the accommodating casing, a chain lock disposed in the open channel, the chain lock configured to disassemble the display module into a first assembly and a second assembly and configured to combine the first assembly and the second assembly into the display module; and a resilient member, a first roller, and a second roller disposed in the hollow cavity, the resilient member fixed in the hollow cavity, the first assembly connected to an end of the resilient member through the first roller, and the first roller configured to roll up or unroll the first assembly, the second assembly connected to the second roller, and the second roller configured to roll up or unroll the second assembly;

wherein the display module is rolled up or unrolled by locking or unlocking the chain lock, and a radius of a cross section of the first roller is less than or equal to a radius of a cross section of the second roller.

2. The flexible display device as claimed in claim 1, wherein the flexible display device comprises at least two first rollers, and the at least two first rollers are disposed parallelly and are staggered, when at least one portion of the first assembly is received in the accommodating casing, the first assembly forms a S-shaped curve rolled up between adjacent two of the first rollers.

3. The flexible display device as claimed in claim 1, wherein the radius of the first roller is less than or equal to 1 mm.

4. The flexible display device as claimed in claim 1, wherein contact surfaces of the display panel and the metal supporting layer are disposed with protrusions and indentations respectively, and the protrusions match the indentations.

5. The flexible display device as claimed in claim 4, wherein the chain lock is connected to an edge portion of the display module, when the chain lock combines the first assembly and the second assembly into the display module, the protrusions and the indentations of the contact surfaces of the display panel and the metal supporting layer are engaged with one another, when the chain lock disassembles the display module into the first assembly and the second assembly, the protrusions and the indentations of the contact surfaces of the display panel and the metal supporting layer are disengaged from one another.

6. The flexible display device as claimed in claim 1, wherein the first assembly comprises the protective lid, the second assembly comprises the display panel and the metal supporting layer; or, the first assembly comprises the protective lid and the display panel, and the second assembly comprises the metal supporting layer.

7. The flexible display device as claimed in claim 1, wherein the flexible display device further comprises a handgrip, the handgrip is disposed outside the hollow cavity and is arranged corresponding to the open channel, and the handgrip is connected to an end of the display module, a length/width of the handgrip is large than a length/width of the open channel, and the handgrip is configured to hold the end of the display module outside the hollow cavity when the display module is rolled up and received in the accommodating casing.

8. The flexible display device as claimed in claim 1, wherein the resilient member comprises a spiral spring, and an end of the spiral spring is connected to a first extension portion of the protective lid.

9. The flexible display device as claimed in claim 1, wherein a second extension portion of the metal supporting layer is connected to the second roller.

10. The flexible display device as claimed in claim 1, wherein a lock is disposed in the open channel, the lock is locked when the display panel is pulled out from the accommodating casing for a determined length, and the lock is unlocked when the display module is rolled up.

11. A flexible display device, comprising:

a display module, the display module comprising a display panel, and a protective lid and a metal supporting layer located on two sides of the display panel respectively;

an accommodating casing, a hollow cavity defined in the accommodating casing, an open channel defined in a side of the accommodating casing, a chain lock disposed in the open channel, the chain lock configured to disassemble the display module into a first assembly and a second assembly and configured to combine the first assembly and the second assembly into the display module; and a resilient member, a first roller, and a second roller disposed in the hollow cavity, the resilient member fixed in the hollow cavity, the first assembly connected to an end of the resilient member through the first roller, and the first roller configured to roll up or unroll the first assembly, the second assembly connected to the second roller, and the second roller configured to roll up or unroll the second assembly;

wherein the display module is rolled up or unrolled by locking or unlocking the chain lock.

12. The flexible display device as claimed in claim 11, wherein the flexible display device comprises at least two first rollers, and the at least two first rollers are disposed parallelly and are staggered, when at least one portion of the first assembly is received in the accommodating casing, the first assembly forms a S-shaped curve rolled up between adjacent two of the first rollers.

13. The flexible display device as claimed in claim 11, wherein a radius of the first roller is less than or equal to 1 mm.

14. The flexible display device as claimed in claim 11, wherein contact surfaces of the display panel and the metal supporting layer are disposed with protrusions and indentations respectively, and the protrusions match the indentations.

15. The flexible display device as claimed in claim 14, wherein the chain lock is connected to an edge portion of the display module, when the chain lock combines the first assembly and the second assembly into the display module, the protrusions and the indentations of the contact surfaces of the display panel and the metal supporting layer are engaged with one another, when the chain lock disassembles the display module into the first assembly and the second assembly, the protrusions and the indentations of the contact surfaces of the display panel and the metal supporting layer are disengaged from one another.

16. The flexible display device as claimed in claim 11, wherein the first assembly comprises the protective lid, the second assembly comprises the display panel and the metal supporting layer; or, the first assembly comprises the protective lid and the display panel, and the second assembly comprises the metal supporting layer.

17. The flexible display device as claimed in claim 11, wherein the flexible display device further comprises a handgrip, the handgrip is disposed outside the hollow cavity and is arranged corresponding to the open channel, and the handgrip is connected to an end of the display module, a length/width of the handgrip is large than a length/width of the open channel, and the handgrip is configured to hold the end of the display module outside the hollow cavity when the display module is rolled up and received in the accommodating casing.

18. The flexible display device as claimed in claim 11, wherein the resilient member comprises a spiral spring, and an end of the spiral spring is connected to a first extension portion of the protective lid.

19. The flexible display device as claimed in claim 11, wherein a second extension portion of the metal supporting layer is connected to the second roller.

20. The flexible display device as claimed in claim 11, wherein a lock is disposed in the open channel, the lock is locked when the display panel is pulled out from the accommodating casing for a determined length, and the lock is unlocked when the display module is rolled up.

* * * * *